US009803096B2

(12) United States Patent
Nishimura

(10) Patent No.: US 9,803,096 B2
(45) Date of Patent: Oct. 31, 2017

(54) AQUEOUS INKJET PIGMENT DISPERSION, METHOD FOR PRODUCING SAME, AND AQUEOUS INKJET INK

(71) Applicant: FUJIFILM CORPORATION, Minato-ku, Tokyo (JP)

(72) Inventor: Naoko Nishimura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/249,478

(22) Filed: Aug. 29, 2016

(65) Prior Publication Data

US 2016/0369117 A1 Dec. 22, 2016

Related U.S. Application Data

(63) Continuation of application No. PCT/JP2015/056727, filed on Mar. 6, 2015.

(30) Foreign Application Priority Data

Mar. 31, 2014 (JP) ................................ 2014-074721

(51) Int. Cl.
| | | |
|---|---|---|
| C09D 11/107 | (2014.01) | |
| C09D 11/08 | (2006.01) | |
| C09D 11/322 | (2014.01) | |
| C09D 11/326 | (2014.01) | |
| C09D 17/00 | (2006.01) | |
| C09B 67/08 | (2006.01) | |
| C09B 67/46 | (2006.01) | |
| C09D 11/38 | (2014.01) | |
| C09D 11/104 | (2014.01) | |

(52) U.S. Cl.
CPC .......... *C09D 11/322* (2013.01); *C09B 67/009* (2013.01); *C09B 67/0013* (2013.01); *C09D 11/08* (2013.01); *C09D 11/104* (2013.01); *C09D 11/107* (2013.01); *C09D 11/326* (2013.01); *C09D 11/38* (2013.01); *C09D 17/00* (2013.01); *C09D 17/001* (2013.01); *C09D 17/003* (2013.01)

(58) Field of Classification Search
None
See application file for complete search history.

(56) References Cited

U.S. PATENT DOCUMENTS

| | | | | |
|---|---|---|---|---|
| 2,273,040 A | * | 2/1942 | Iler | .......................... C04B 41/46 |
| | | | | 106/453 |
| 3,025,172 A | * | 3/1962 | Bernstein | .................. C09C 3/08 |
| | | | | 106/31.73 |
| 3,470,007 A | * | 9/1969 | Linton | ....................... C09C 1/20 |
| | | | | 106/434 |
| 3,940,385 A | * | 2/1976 | Smith | ....................... C08K 9/04 |
| | | | | 106/222 |
| 3,956,005 A | * | 5/1976 | Sugahara | ............... C09C 1/0003 |
| | | | | 106/414 |
| 6,313,300 B1 | * | 11/2001 | Hendi | ................... C07D 471/04 |
| | | | | 106/495 |
| 2005/0250875 A1 | * | 11/2005 | Marr | ..................... C09B 67/006 |
| | | | | 523/160 |
| 2009/0227711 A1 | * | 9/2009 | Carlini | ................ C09B 67/0013 |
| | | | | 524/90 |
| 2012/0229559 A1 | * | 9/2012 | Matsushita | ........... C09D 11/322 |
| | | | | 347/21 |

FOREIGN PATENT DOCUMENTS

| | | | | |
|---|---|---|---|---|
| GB | 1350284 A | * | 4/1974 | ................ C08F 8/00 |
| JP | 2004-43776 A | | 2/2004 | |
| JP | 2007-070568 A | | 3/2007 | |
| JP | 2010-7020 A | | 1/2010 | |
| JP | 2011-144240 A | | 7/2011 | |
| JP | 2011-231315 A | | 11/2011 | |
| JP | 2012-187868 A | | 10/2012 | |

OTHER PUBLICATIONS

Japanese Office Action dated Feb. 14, 2017 in corresponding Japanese Patent Application No. 2014-074721 and a Partial English Translation thereof.
Extended European Search Report dated Dec. 7, 2016, issued in corresponding EP Patent Application.
International Search Report issued in International Application No. PCT/JP2015/056727 dated Jun. 9, 2015.
Written Opinion of the ISA issued in International Application No. PCT/JP2015/056727 dated Jun. 9, 2015.

* cited by examiner

*Primary Examiner* — Peter A Salamon
(74) *Attorney, Agent, or Firm* — SOLARIS Intellectual Property Group, PLLC

(57) ABSTRACT

Provided are a method for producing an aqueous inkjet pigment dispersion, including producing a mixed liquid of water, a pigment, a pigment dispersing polymer, and rosin acid in an amount of from 3% by mass to 30% by mass relative to the total mass of the pigment, and reducing the amount of rosin acid included in the produced mixed liquid, to less than 3.0% by mass relative to the total mass of the pigment; an aqueous inkjet pigment dispersion; and an aqueous inkjet ink.

11 Claims, No Drawings

AQUEOUS INKJET PIGMENT DISPERSION, METHOD FOR PRODUCING SAME, AND AQUEOUS INKJET INK

CROSS-REFERENCE TO RELATED APPLICATIONS

This application is a continuation application of International Application No. PCT/JP2015/056727, filed Mar. 6, 2015, the disclosure of which is incorporated herein by reference in its entirety. Further, this application claims priority from Japanese Patent Application No. 2014-074721, filed Mar. 31, 2014, the disclosure of which is incorporated herein by reference in its entirety.

BACKGROUND OF THE INVENTION

1. Field of the Invention

The present invention relates to an aqueous inkjet pigment dispersion, a method for producing the same, and an aqueous inkjet ink.

2. Description of the Related Art

In recent years, by virtue of the progress in inkjet recording technologies, inkjet recording methods have come to be used to obtain high-precision images in photography and offset printing, and there is a demand for high-quality recording based on inkjet recording.

In regard to the demand described above, JP2004-43776A discloses a method for producing an ink that has excellent dispersion stability and produces printed matter having excellent color developability or transparency, the method comprising a step for obtaining a solution including a water-insoluble coloring material and a dispersant dissolved in an aprotic organic solvent in the presence of an alkali; a step for mixing this solution with water, and obtaining a dispersion in which particles containing the water-insoluble color material and the dispersant are dispersed; a step for aggregating the dispersion through addition of an acid, and thus separating out aggregates; and a step for redispersing the particles of the aggregates through an alkali treatment.

JP2011-231315A discloses an ink composition which uses a polymerizable compound and a pigment dispersoid, the ink composition being an ink composition which exhibits excellent ejection reliability over a long time period and is capable of forming images that are free of defects such as white streaks. The disclosed ink composition includes a pigment coated with a dispersive polymer that is obtainable by crosslinking a water-soluble dispersant with a crosslinking agent, and also includes a water-soluble polymerizable compound, a polymerization initiator, and water.

JP2010-7020A discloses a pigment dispersion in which a pigment is finely dispersed, and even in a case in which the pigment dispersoid has been stored for a long time period, the pigment exhibits excellent dispersion stability, the pigment dispersoid including a pigment; a polymer containing a repeating unit having a particular structure having a resin acid derivative and having a weight-average molecular weight in the range of 10,000 to 1,000,000; and a polymerizable compound.

SUMMARY OF THE INVENTION

However, there are occasions in which the inks and pigment dispersions disclosed in JP2004-43776A, JP2011-231315A, and JP2010-7020A exhibit decreased pigment dispersibility, such as detachment of the dispersant with which the pigment is coated. Therefore, there is room for further enhancement of dispersibility during the process of dispersing the pigment.

Furthermore, among the components that are added as dispersants in inks and pigment dispersions, there are components which, when included in a certain amount or more, instead decrease the storage stability of the inks and pigment dispersions thus prepared, and which decrease ejectability (abietic acid and the like). Therefore, when the content of any component that decreases storage stability and ejectability in the inks and pigment dispersions thus prepared is decreased, there is room for further improvement in storage stability and ejectability.

Particularly, in a case in which the pigment itself has a structure of abietic acid or the like as in the case of JP2010-7020A, since it is difficult to eliminate abietic acid or the like, it is difficult to achieve a balance between dispersibility and storage stability.

The present invention was achieved in view of such circumstances, and it is an object of the invention to achieve the following purposes.

That is, an object of the invention is to provide an aqueous inkjet pigment dispersion having excellent dispersibility, excellent storage stability after being dispersed, and excellent ejectability when the pigment dispersion is formed into an ink; a method for producing the same; and an aqueous inkjet ink.

Specific means for addressing the object includes the following embodiments.

<1> A method for producing an aqueous inkjet pigment dispersion, the method comprising a mixed liquid production step for producing a mixed liquid of water, a pigment, a pigment dispersing polymer, and rosin acid in an amount of from 3% by mass to 30% by mass relative to the total mass of the pigment; and a reduction step for reducing the amount of the rosin acid included in the mixed liquid obtained from the mixed liquid production step, to less than 3.0% by mass relative to the total mass of the pigment.

<2> The method for producing an aqueous inkjet pigment dispersion according to <1>, wherein the amount of rosin acid after the reduction step is 0.25% by mass or more and less than 3.0% by mass relative to the total mass of the pigment.

<3> The method for producing an aqueous inkjet pigment dispersion according to <1> or <2>, wherein the reduction step involves reduction of the amount of rosin acid using ultrafiltration.

<4> The method for producing an aqueous inkjet pigment dispersion according to any one of <1> to <3>, further comprising a step for crosslinking the pigment dispersing polymer after the mixed liquid production step.

<5> The method for producing an aqueous inkjet pigment dispersion according to any one of <1> to <4>, wherein the mixed liquid production step involves mixing of the pigment with rosin acid and then mixing the mixture with the pigment dispersing polymer.

<6> The method for producing an aqueous inkjet pigment dispersion according to any one of <1> to <5>, wherein the acid value of the pigment dispersing polymer is 90 mg KOH/g to 150 mg KOH/g.

<7> The method for producing an aqueous inkjet pigment dispersion according to any one of <1> to <6>, wherein the acid value of the pigment dispersing polymer is 100 mg KOH/g to 120 mg KOH/g.

<8> The method for producing an aqueous inkjet pigment dispersion according to any one of <1> to <7>, wherein the pigment dispersing polymer has a hydrophilic structural unit and a hydrophobic structural unit.

<9> The method for producing an aqueous inkjet pigment dispersion according to any one of <1> to <8>, wherein the pigment dispersing polymer has a hydrophilic structural unit derived from (meth)acrylic acid, and a hydrophobic structural unit derived from at least one selected from $C_1$-$C_{20}$ alkyl (meth)acrylate and derivatives thereof, benzyl (meth) acrylate and derivatives thereof, and phenoxyethyl (meth) acrylate and derivatives thereof.

<10> The method for producing an aqueous inkjet pigment dispersion according to any one of <1> to <9>, wherein in the mixed liquid production step, a compound having an acetylenediol group is further incorporated.

<11> An aqueous inkjet pigment dispersion comprising water, a pigment coated with a pigment dispersing polymer, and rosin acid in an amount of 0.25% by mass or more and less than 3.0% by mass relative to the total mass of the pigment, in which the aqueous inkjet pigment dispersion has a polydispersity index of 1.10 to 1.45.

<12> The aqueous inkjet pigment dispersion according to <11>, wherein the pigment dispersing polymer has a cross-linked structure.

<13> The aqueous inkjet pigment dispersion according to <11> or <12>, further comprising a compound having an acetylenediol group.

<14> An aqueous inkjet ink comprising the aqueous inkjet pigment dispersion according to any one of <11> to <13>.

According to the invention, an aqueous inkjet pigment dispersion having excellent dispersibility, excellent storage stability after being dispersed, and excellent ejectability when produced into an ink; a method for producing the same; and an aqueous inkjet ink can be provided.

DESCRIPTION OF THE PREFERRED EMBODIMENTS

Hereinafter, the aqueous inkjet pigment dispersion of the invention, the method for producing the same, and an aqueous inkjet ink will be explained in detail.

According to the present specification, a numerical value range expressed using "to" represents a range including the numerical values described before and after "to" as the minimum value and the maximum value, respectively.

<Method for Producing Pigment Dispersion>

The method for producing an aqueous inkjet pigment dispersion of the invention includes a mixed liquid production step for producing a mixed liquid of water, a pigment, a pigment dispersing polymer, and rosin acid in an amount of from 3% by mass to 30% by mass relative to the total mass of the pigment; and a reduction step for reducing the amount of rosin acid that is included in the mixed liquid obtained from the mixed liquid production step, to less than 3.0% by mass relative to the total mass of the pigment.

According to the present specification, "rosin acid" means a mixture consisting of one kind or two or more kinds selected from abietic acid and salts thereof, neoabietic acid and salts thereof, dehydroabietic acid and salts thereof, palustric acid and salts thereof, levopimaric acid and salts thereof, pimaric acid and salts thereof, isopimaric acid and salts thereof, and citronellic acid and salts thereof.

According to the present specification, the "amount of rosin acid" means the total amount of the components included in the "rosin acid".

The operating mechanism of the invention is not clearly known; however, the present inventors speculate about the operating mechanism as follows.

That is, according to the method for producing a pigment dispersion of the invention, when a mixed liquid of a pigment, a pigment dispersing polymer, and a predetermined amount of rosin acid is produced in the mixed liquid production step, since rosin acid enhances wettability of the pigment surface, the pigment surface is efficiently coated with the pigment dispersing polymer. As a result, it is speculated that dispersibility of the pigment dispersion is enhanced.

Furthermore, in a case in which the pigment dispersing polymer with which the pigment surface is coated is cross-linked, when the mixed liquid includes rosin acid, cross-linking of the pigment dispersing polymer is accelerated. Therefore, dispersibility of the pigment dispersion is further enhanced.

In the reduction step according to the invention, when the amount of rosin acid included in the mixed liquid is reduced to a certain amount, the influence of rosin acid is cleared. Therefore, it is speculated that the pigment dispersion has enhanced storage stability and enhanced ejectability when the pigment dispersion is produced into an ink.

As described above, since the method for producing a pigment dispersion of the invention includes the mixed liquid production step and the reduction step described above, a pigment dispersion which has excellent storage stability and ejectability while maintaining excellent dispersibility can be obtained.

The various steps of the production method of the invention will be explained below.

<<Mixed Liquid Production Step>>

The method for producing a pigment dispersion according to the invention has a mixed liquid production step for producing a mixed liquid of at least water, a pigment, a pigment dispersing polymer, and rosin acid in an amount of from 3% by mass to 30% by mass relative to the total mass of the pigment.

In the mixed liquid production step of the invention, if the amount of incorporation of rosin acid is less than 3% by mass relative to the total mass of the pigment, wettability of the pigment surface at the time of mixing is not sufficient, and pigment dispersibility becomes poor when the components are formulated into a mixed liquid. Furthermore, if the amount of incorporation of rosin acid is more than 30% by mass relative to the total mass of the pigment, the mixed liquid is gelled, and the pigment cannot be dispersed.

The amount of incorporation of rosin acid as used herein also includes the amount of rosin acid in the pigment containing added rosin acid, which will be described below.

The amount of incorporation of rosin acid in the mixed liquid production step is from 3% by mass to 30% by mass relative to the total mass of the pigment, preferably from 3% by mass to 15% by mass, and more preferably from 3% by mass to 10% by mass.

In the mixed liquid production step, when the amount of incorporation of rosin acid is adjusted to the range described above, the polydispersity index (PDI) of the polymer-coated pigment that is included in the pigment dispersion can be adjusted to a suitable range. Meanwhile, the polymer-coated pigment and the polydispersity index will be described below.

In the mixed liquid production step, there are no particular limitations on the order of mixing the pigment, the pigment dispersing polymer, and rosin acid; however, from the viewpoint of further enhancing dispersibility of the pigment, it is preferable that the pigment and rosin acid are mixed, and then the resultant is mixed with the pigment dispersing polymer.

In a case in which the pigment and rosin acid are mixed, and then the resultant is mixed with the pigment dispersing polymer in the mixed liquid production step, it is preferable to use a pigment containing added rosin acid, which will be described below. That is, it is preferable to mix a pigment containing added rosin acid with a pigment dispersing polymer.

In the mixed liquid production step, the method for mixing the various components is not particularly limited. Mixing of the various components in the mixed liquid production step can be carried out using a two-roll, a three-roll, a ball mill, a TRON mill, a DISPER, a kneader, a co-kneader, a homogenizer, a blender, a single-screw or twin-screw extruder, or the like.

Regarding the details of mixing and dispersing, reference can be made to the descriptions in T. C. Patton, "Paint Flow and Pigment Dispersion" (1964, published by John Wiley and Sons), and the like.

(Rosin Acid)

According to the invention, rosin acid is a mixture comprising one kind or two or more kinds elected from abietic acid and salts thereof, neoabietic acid and salts thereof, dehydroabietic acid and salts thereof, palustric acid and salts thereof, levopimaric acid and salts thereof, pimaric acid and salts thereof, isopimaric acid and salts thereof, and citronellic acid and salts thereof, as described above.

The salts included in rosin acid are preferably metal salts, and calcium salts are more preferred.

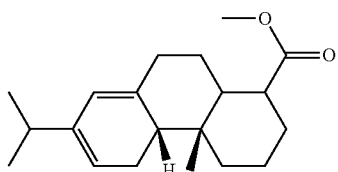

Levopimaric acid

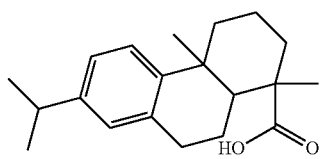

Dehydroabietic acid

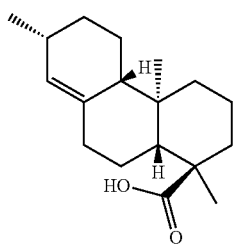

Pimaric acid

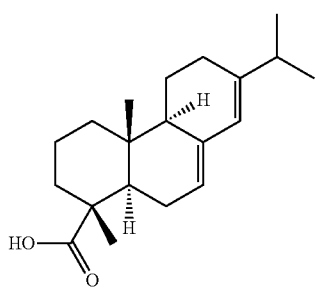

Abietic acid

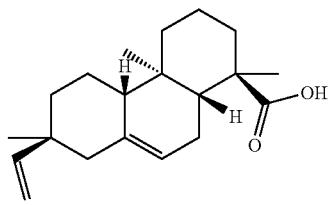

Isopimaric acid

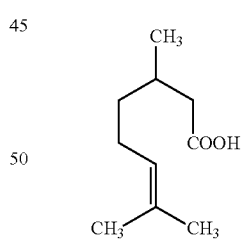

Citronellic acid

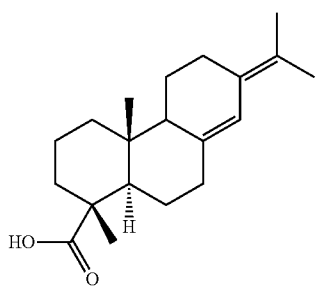

Neoabietic acid

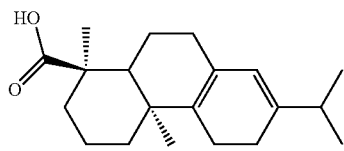

Palustric acid

Rosin acid is generally a resin component extracted from pine resin, and the components included and ratios thereof vary depending on the method for extraction. Representative examples include rosin gum, tall rosin, and wood rosin. The compositions of these materials are presented in the following Table 1. The numerical values in the following Table 1 represent percentage (%) by mass of the various components in rosin acid.

Among these rosin acids, rosin gum can be suitably used for the pigment dispersion of the invention.

TABLE 1

| | Conjugated resin acid | | | Non-conjugated resin acid | | |
|---|---|---|---|---|---|---|
| | Abietic acid | Neoabietic acid | Palustric acid | Pimaric acid | Isopimaric acid | Dehydroabietic acid |
| Tall rosin | 33 to 48 | 2 to 8 | 10 to 20 | 3 to 8 | 4 to 10 | 15 to 25 |
| Rosin gum | 25 to 45 | 10 to 25 | 10 to 25 | 4 to 8 | 2 to 8 | 3 to 7 |
| Wood rosin | 35 to 45 | 2 to 10 | 10 to 20 | 5 to 8 | 10 to 15 | 10 to 15 |

(Pigment)

The pigment according to the invention is not particularly limited and can be appropriately selected according to the purpose. Examples of the pigment include an organic pigment and an inorganic pigment, and any of them may be used.

Examples of the organic pigment include an azo pigment, a polycyclic pigment, a chelate dye, a nitro pigment, a nitroso pigment, and aniline black. Among these organic pigments, an azo pigment, a polycyclic pigment, and the like are more preferred.

Examples of the azo pigment include an azo lake, an insoluble azo pigment, a condensed azo pigment, and a chelated azo pigment.

Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment.

Examples of the chelate dye include a basic dye-type chelate and an acid dye-type chelate.

Examples of the inorganic pigment include titanium oxide, iron oxide, calcium carbonate, barium sulfate, aluminum hydroxide, barium yellow, cadmium red, chromium yellow, and carbon black. Among these inorganic pigments, carbon black is particularly preferred. Meanwhile, examples of carbon black include those produced according to known methods such as a contact method, a furnace method, and a thermal method.

Examples of a black-based pigment include carbon black. Specific examples of carbon black include, but are not limited to, RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080, RAVEN 1060, RAVEN 700 (all manufactured by Columbian Carbon Company); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300, MONARCH 1400 (all manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A, SPECIAL BLACK 4 (all manufactured by Degussa AG); No. 25, No. 33, No. 40, No. 45, No. 47, No. 52, No. 900, No. 2200B, No. 2300, MCF-88, MA600, MA7, MA8, and MA100 (all manufactured by Mitsubishi Chemical Corporation).

Examples of a yellow-based pigment include C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180.

Examples of a magenta-based pigment include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (Bengala), 104, 105, 106, 108 (Cadmium red), 112, 114, 122 (Quinacridone magenta), 123, 146, 149, 163, 166, 168, 170, 172, 177, 178, 179, 184, 185, 190, 193, 202, 209, 219, and 269; and C.I. Pigment Violet 19. C.I. Pigment Red 122 is particularly preferred.

Examples of a cyan-based pigment include C.I. Pigment Blue 1, 2, 3, 15, 15:1, 15:2, 15:3, 15:34, 16, 17:1, 22, 25, 56, and 60; and C.I. Vat Blue 4, 60, and 63. C.I. Pigment Blue 15:3 is particularly preferred.

The pigments described above may be used singly, or plural kinds may be selected from within the various groups described above, or from among the various groups, and these may be used in combination.

Regarding the pigment according to the invention, it is preferable to use a pigment containing added rosin acid. Specific examples of the pigment containing added rosin acid include FUJI FAST RED (manufactured by Fuji Pigment Co., Ltd.).

The content of the pigment according to the invention is preferably from 0.1% by mass to 20% by mass, more preferably from 1% by mass to 18% by mass, and particularly preferably from 5% by mass to 15% by mass, relative to the total mass of the pigment dispersion, from the viewpoints of color developability, granularity, storage stability, and ejection reliability.

(Pigment Dispersing Polymer)

Regarding the pigment dispersing polymer (hereinafter, appropriately referred to as dispersant) according to the invention, a polymeric dispersant may be mentioned. The polymeric dispersant may be any one of a non-water-soluble polymeric dispersant and a water-soluble polymeric dispersant.

According to the invention, the term "water-soluble" for a water-soluble polymeric dispersant means that when the polymeric dispersant is dried under reduced pressure for 2 hours at 105° C. and then dissolved in 100 g of water at 25° C., the dissolved amount of the polymeric dispersant is 5.0 g or more. The dissolved amount of the polymeric dispersant is preferably 10.0 g or more, and more preferably 15.0 g or more. The dissolved amount is a dissolved amount obtainable when the salt-forming groups of a polymeric dispersant are 100% neutralized with potassium hydroxide.

It is preferable that the polymeric dispersant has at least one hydrophilic structural unit and at least one hydrophobic structural unit.

A hydrophilic structural unit is a structural unit containing at least one hydrophilic group. Examples of the hydrophilic group include a nonionic group, a carboxy group, a sulfonic acid group, and a phosphoric acid group. Examples of the nonionic group include a hydroxyl group, an amide group (having an unsubstituted nitrogen atom), a group derived from an alkylene oxide polymer (for example, polyethylene oxide or polypropylene oxide), and a group derived from a sugar alcohol. The content ratio of the hydrophilic structural unit and the hydrophobic structural unit is preferably in the range of (hydrophilic moiety:hydrophobic moiety)=15:85 to 40:60, and most preferably in the range of (hydrophilic moiety:hydrophobic moiety)=15:85 to 30:70.

The hydrophilic structural unit is preferably an acidic group, and a structural unit having a carboxy group is more preferred.

Examples of the structural unit having a carboxy group include structural units derived from (meth)acrylic acid, β-carboxyethyl acrylate, fumaric acid, itaconic acid, maleic acid, and crotonic acid. Among these structural units having a carboxy group, structural units derived from (meth)acrylic acid and β-carboxyethyl acrylate are preferred, and structural units derived from (meth)acrylic acid are more preferred.

Examples of the hydrophobic structural unit include structural units derived from (meth)acrylic acid esters, and structural units derived from aromatic group-containing monomers.

Among these hydrophobic structural units, a structural unit derived from at least one selected from $C_1$-$C_{20}$ alkyl (meth)acrylate, benzyl (meth)acrylate, phenoxyethyl (meth) acrylate, and derivatives thereof is preferred.

These hydrophobic structural units may be included singly or in combination of two or more kinds thereof in the polymeric dispersant.

Regarding the polymeric dispersant according to the invention, for example, a (meth)acrylic acid-benzyl (meth) acrylate copolymer, a (meth)acrylic acid-phenoxyethyl (meth)acrylate copolymer, and a (meth)acrylic acid-phenoxyethyl (meth)acrylate-$C_1$-$C_{20}$ alkyl (meth)acrylate copolymer can be suitably used.

According to the invention, the term "(meth)acrylic acid" refers to acrylic acid or methacrylic acid, and the term "(meth)acrylic acid ester" ("(meth)acrylate") refers to acrylic acid ester (acrylate) or methacrylic acid ester (methacrylate).

The polymeric dispersant is preferably a dispersant having a hydrophilic structural unit having a carboxy group, from the viewpoint of dispersibility, and the acid value is preferably 90 mg KOH/g to 150 mg KOH/g, and more preferably 100 mg KOH/g to 120 mg KOH/g.

The acid value is measured by the method described in JIS Standards (JIS K0070, 1992).

The weight-average molecular weight of the polymeric dispersant is preferably 1,000 to 100,000, more preferably 3,000 to 50,000, and even more preferably 5,000 to 40,000.

The weight-average molecular weight is measured by gel permeation chromatography (GPC). HLC-8020GPC (manufactured by Tosoh Corporation) is used for the GPC machine, three TSKgel SUPER MULTIPORE HZ-H columns (manufactured by Tosoh Corporation, 4.6 mm ID×15 cm) are used, and THF (tetrahydrofuran) is used as an eluent. Furthermore, regarding the conditions, measurement is carried out under the conditions of a sample concentration of 0.45% by mass, a flow rate of 0.35 ml/min, a sample injection amount of 10 μl, and a measurement temperature of 40° C., using an RI detector. Furthermore, a calibration curve is produced using eight samples of "Standard Sample TSK standard, polystyrene": "F-40", "F-20", "F-4", "F-1", "A-5000", "A-2500", "A-1000", and "n-propylbenzene", manufactured by Tosoh Corporation.

The mixing mass ratio (p:s) of the pigment (p) and the polymeric dispersant (s) is preferably in the range of 10:1 to 10:8, more preferably in the range of 10:1 to 10:7, and even more preferably 10:1 to 10:5.

In regard to the mixed liquid obtainable from the mixed liquid production step of the invention, the pigment is preferably a pigment having a configuration of being coated with a pigment dispersing polymer (non-crosslinked polymer-coated pigment), and more preferably a pigment in which the pigment dispersing polymer for coating the pigment has a crosslinked structure (crosslinked polymer-coated pigment). According to the present specification, a non-crosslinked polymer-coated pigment and a crosslinked polymer-coated pigment are collectively referred to as polymer-coated pigments.

Coating of the pigment with the pigment dispersing polymer can be carried out by a conventionally known method. Specifically, for example, a polymer-coated pigment in which at least a portion of the pigment surface is coated with a pigment dispersing polymer can be obtained according to the method described in JP2009-190379A.

The average particle size of the polymer-coated pigment in a state of being dispersed in the pigment dispersion is preferably 10 nm to 200 nm, more preferably 50 nm to 150 nm, and even more preferably 80 nm to 130 nm. When the average particle size is 200 nm or less, satisfactory color reproducibility is obtained, and satisfactory droplet ejection characteristics are obtained when the pigment dispersion is ejected in droplets by an inkjet method. When the average particle size is 10 nm or more, satisfactory light resistance is obtained.

The average particle size can be determined by measuring the volume average particle size by a dynamic light scattering method using NANOTRAC particle size distribution measurement apparatus UPA-EX150 (manufactured by Nikkiso Co., Ltd.).

(Water)

The pigment dispersion contains water, and the amount of water is not particularly limited. A preferred content of water in the pigment dispersion is 40% by mass to 99% by mass, more preferably 50% by mass to 95% by mass, and even more preferably 60% by mass to 95% by mass.

In the mixed liquid production step according to the invention, it is preferable to additionally incorporate a surfactant in addition to water, a pigment, a pigment dispersing polymer, and rosin acid.

(Surfactant)

In the mixed liquid production step, when a surfactant is incorporated into the mixed liquid, wettability and dispersibility of the pigment are further enhanced.

Examples of the surfactant include a nonionic surfactant, a cationic surfactant, an anionic surfactant, and a betaine-based surfactant.

Specific preferred examples of the surfactant include, in the hydrocarbon series, anionic surfactants such as a fatty acid salt, an alkyl sulfuric acid ester salt, an alkyl benzenesulfonic acid salt, an alkyl naphthalenesulfonic acid salt, a dialkyl sulfosuccinic acid salt, an alkyl phosphoric acid ester salt, a naphthalenesulfonic acid-formalin condensate, and a polyoxyethylene alkyl sulfuric acid ester salt; and nonionic surfactants such as a polyoxyethylene alkyl ether, a polyoxyethylene alkyl allyl ether, a polyoxyethylene fatty acid ester, a sorbitan fatty acid ester, a polyoxyethylene sorbitan fatty acid ester, a polyoxyethylene alkylamine, a glycerin fatty acid ester, and an oxyethylene-oxypropylene block copolymer.

Furthermore, amine oxide type amphoteric surfactants such as N,N-dimethyl-N-alkylamine oxide are also preferred.

Furthermore, the compounds listed as surfactants in pp. (37) to (38) of JP1984-157636A (JP-S59-157636A), and Research Disclosure No. 308119 (1989) can also be used.

Scratch resistance can also be ameliorated by using the fluorine-based (fluoroalkyl-based) surfactants, silicone-based surfactants and the like described in JP2003-322926A, JP2004-325707A, and, and JP2004-309806A.

Among these surfactants, from the viewpoint that dispersibility of the mixed liquid can be enhanced by further enhancing wettability of the pigment surface in the mixed liquid production step, a nonionic surfactant is preferred, and a compound having an acetylenediol group is more preferred.

(Compound Having Acetylenediol Group)

The compound having an acetylenediol group according to the invention is more preferably an ethylene oxide adduct of acetylenediol.

Specific examples of the compound having an acetylenediol group include 2,4,7,9-tetramethyl-5-decyne-4,7-diol, 3,6-dimethyl-4-octyne-3,6-diol, and 3,5-dimethyl-1-hexyn-3-ol.

Also, for the compound having an acetylenediol group, a commercially available product can be used. Specific examples include SURFYNOL 82, 465, 485, DYNOL 604 and 607, all manufactured by Air Products & Chemicals, Inc.; and OLFINE STG and OLFINE E1010, all manufactured by Nissin Chemical Industry Co., Ltd.

The amount of addition of the surfactant is preferably 5% by mass to 30% by mass, more preferably 5% by mass to 25% by mass, and even more preferably 5% by mass to 15% by mass, relative to the total mass of the pigment.

The HLB (Hydrophile-Lipophile Balance) value of the surfactant is preferably 6 to 13, and more preferably 8 to 13.

The HLB is a value calculated based on Griffin's HLB value (20 Mw/M; Mw=molecular weight of the hydrophilic moiety, and M=molecular weight of the nonionic surfactant).

<<Step for Crosslinking Pigment Dispersing Polymer>>

It is preferable that the method for producing a pigment dispersion of the invention includes a step for crosslinking the pigment dispersing polymer, after the mixed liquid production step.

In the step for crosslinking the pigment dispersing polymer, crosslinking of the pigment dispersing polymer is carried out.

The step for crosslinking the pigment dispersing polymer desirably comes after the mixed liquid production step, and may be any of before and after the reduction step.

Crosslinking of the pigment dispersing polymer may be carried out by self-crosslinking of the pigment dispersing polymer, may be carried out by crosslinking by a crosslinking agent, or may include both of these.

In the step for crosslinking the pigment dispersing polymer, it is preferable to perform crosslinking as follows, using a crosslinking agent.

Regarding the conditions employed at the time of crosslinking the pigment dispersing polymer, it is preferable to heat with stirring the mixed liquid obtained in the mixed liquid production step, and to adjust the liquid temperature of the mixed liquid to 60° C. to 80° C. After the heating of the mixed liquid, a crosslinking agent is subsequently incorporated into the mixed liquid, and heating is performed for 6 hours, while the liquid is stirred, so as to maintain the liquid temperature. Thus, crosslinking of the pigment dispersing polymer is carried out. Subsequently, the liquid temperature of the mixed liquid is lowered to 25° C., and a mixed liquid in which the pigment dispersing polymer is crosslinked is obtained. The liquid temperature of the mixed liquid in the step for crosslinking the pigment dispersing polymer is more preferably 70° C. to 80° C.

In a case in which the pigment dispersing polymer is to be crosslinked, the pigment dispersing polymer has a functional group capable of reacting with the crosslinking agent that will be described below and forming a crosslinked structure.

The functional group capable of forming a crosslinked structure is not particularly limited, and examples include a carboxy group or a salt thereof, an isocyanate group, and an epoxy group. Among these functional groups, a carboxy group or a salt thereof is preferred from the viewpoint of enhancing dispersibility.

Examples of the pigment dispersing polymer having a functional group capable of forming such a crosslinked structure include an epoxy resin, a silicone resin, a hydroxyl group-functional acrylic resin, a carboxy-functional acrylic acid resin, a polyester resin, and a urethane resin.

Specific examples of the epoxy resin include diethylenetriamine, triethylenetetramine, m-phenylenediamine, methylenedianiline, a polycarboxylic acid, a dicarboxylic acid, phthalic anhydride, benzophenone tetraacid anhydride, hexahydrophthalic anhydride, and pyromellitic dianhydride. Examples of the silicone resin include polymethylsiloxane. Examples of the hydroxyl group-functional acrylic resin include an amino resin and an isocyanate compound.

The crosslinking agent is not particularly limited as long as it is a compound having two or more sites that react with the pigment dispersing polymer; however, from the viewpoint of having excellent reactivity with a carboxy group, a compound having two or more epoxy groups (bifunctional or higher-functional epoxy compound) is preferred.

Specific examples of the bifunctional or higher-functional epoxy compound include ethylene glycol diglycidyl ether, polyethylene glycol diglycidyl ether, 1,6-hexanediol diglycidyl ether, diethylene glycol diglycidyl ether, polyethylene glycol diglycidyl ether, dipropylene glycol diglycidyl ether, polypropylene glycol diglycidyl ether, and trimethylolpropane triglycidyl ether. Polyethylene glycol diglycidyl ether, diethylene glycol diglycidyl ether, and trimethylolpropane triglycidyl ether are preferred.

Regarding the crosslinking agent, a commercially available product can also be used. As a commercially available product, for example, DENACOL EX-321, EX-521, EX-821, EX-830, EX-850, and EX-851, all manufactured by Nagase ChemteX Corporation, can be used.

The molar ratio between the crosslinking sites of the crosslinking agent and the sites to be crosslinked of the dispersant is preferably 1:1.1 to 1:10, more preferably 1:1.1 to 1:5, and even more preferably 1:1.1 to 1:3, from the viewpoints of the crosslinking reaction rate and stability of the pigment body after being crosslinked.

<<Reduction Step>>

The method for producing a pigment dispersion of the invention includes at least a reduction step for reducing the amount of rosin acid that is included in the mixed liquid obtained by the mixed liquid production step, to less than 3.0% by mass relative to the total mass of the pigment.

When the amount of rosin acid included in the dispersion obtainable after the reduction step according to the invention is 3.0% by mass or more, storage stability of the pigment dispersion is deteriorated.

That is, in the method for producing a pigment dispersion of the invention, as the amount of rosin acid that is added in order to enhance dispersibility of the pigment is reduced to a predetermined amount in the reduction step, a pigment dispersion which has excellent storage stability and excellent ejectability when the dispersion is produced into an inkjet ink while maintaining excellent dispersibility, can be obtained in the mixed liquid production step.

The amount of rosin acid after the reduction step according to the invention is preferably 0.25% by mass or more and less than 3.0% by mass, more preferably 0.5% by mass or more and less than 2.0% by mass, and even more preferably 1.0% by mass or more and less than 1.5% by mass, relative to the total mass of the pigment.

In the reduction step, for the rosin acid, it is preferable that the initially added amount is reduced to 50% by mass or less, and more preferably reduced to 0.83% by mass to 40% by mass.

When the amount of rosin acid after the reduction step is 0.25% by mass or more relative to the total mass of the pigment, dispersibility can be further enhanced when the pigment dispersion is produced.

In regard to the reduction step of the invention, the method for reducing the amount of rosin acid is not particularly limited, and conventionally known concentration methods such as ultrafiltration, pressure filtration, acid precipitation, centrifugation, and distillation under reduced pressure; a desalting method, or a solvent removal method can be used. Among these, from the viewpoint that rosin acid can be selectively removed to reach a predetermined amount, it is preferable to concentrate the mixed liquid by ultrafiltration.

Here, ultrafiltration is a filtration method directed to submicron-sized dispersed particles and the like in a solution, during which a solution containing dispersed particles is sieved at a molecular level using a filter membrane having fine pores (micropores) based on the pore size of the membrane and the molecule size of the solute, and thereby separation, fractionation, concentration, and purification of the solute are carried out. Examples of the ultrafiltration system include a total amount filtration system and a cross flow system; however, it is preferable to use a cross flow system in the invention.

Generally, regarding the shape of the filter membrane used for ultrafiltration, examples include a flat-shaped membrane, a pipe-shaped membrane, and a hollow fiber-shaped membrane, and examples of the material of the filter membrane include synthetic polymers such as polyether sulfone (PESU) and polyacrylonitrile; and ceramics. The shape and the material are selected according to the use.

In a case in which ultrafiltration is used in the reduction step of the invention, the material of the filter membrane is preferably polyether sulfone (PESU). Furthermore, the size of the micropores of the filter membrane is preferably 0.2 µm or less, and more preferably 0.1 µm to 0.2 µm. During ultrafiltration, the mixed liquid is introduced into a resolver tank for diafiltration, and the mixed liquid is transported using a tube pump while being stirred with a magnetic stirrer. The flow rate at the time of filtration is preferably 400 mL/min to 700 mL/min, and more preferably 600 mL/min to 700 mL/min. The liquid temperature at this time is maintained at 25° C., and ultrapure water is supplied to make up the filtered portion, so as to maintain the concentration constant all the time. The number of times of filtration in the reduction step may vary depending on the cleaning efficiency of the liquid to be filtered; however, filtration is performed at a volume multiple ratio of about 10 times the mixed liquid to which the filtrate has been fed. At this time, one volume multiple ratio is counted as one time, and 8 times to 14 times is a preferred range of the number of times of filtration, and 10 times to 14 times is a more preferred range of the number of times of filtration.

The average particle size of the polymer-coated pigment in the pigment dispersion that has been subjected to the mixed liquid production step and the reduction step of the invention is preferably 10 nm to 200 nm, more preferably 50 nm to 150 nm, and even more preferably 80 nm to 130 nm.

The average particle size can be measured by the method previously described.

Available as an index for evaluating dispersibility of the polymer-coated pigment according to the invention is the polydispersity index (PDI).

The polydispersity index (PDI) as used herein is an index that defines the particle size distribution of dispersed particles, and this is defined by the following Expression (1):

$$PDI=(D90-D10)/D50: \qquad \text{Expression (1)}$$

In Expression (1), regarding D90, D50, and D10, the integrals of the respective distribution functions $dG=F(D)$ dD represent particle sizes equivalent to 0.9 (90 number %), 0.5 (50 number %), and 0.1 (10 number %) of the total particle number of the particles. Meanwhile, G represents the particle number of dispersed particles, and D represents the particle size of dispersed particles.

D90, D50, and D10 can be estimated from the average particle size measured by a dynamic light scattering method using NANOTRAC particle size distribution measurement apparatus UPA-EX150 (manufactured by Nikkiso Co., Ltd.). The pigment concentration at the time of measurement is adjusted to 0.75%, and measurement is made at 25° C.

In the relational expression described above, as the particle size distribution is narrower, the PDI is closer to 1.0; on the contrary, as the particle size distribution is wider, that is, as the dispersibility is higher, the PDI becomes higher.

The polydispersity index (PDI) of the polymer-coated pigment included in the pigment dispersion of the invention is preferably 1.10 to 1.45, more preferably 1.15 to 1.30, and even more preferably 1.15 to 1.25.

The pigment dispersion of the invention is preferably a pigment dispersion which includes water, a pigment coated with a pigment dispersing polymer, and rosin acid in an amount of 0.25% by mass or more and less than 3.0% by mass relative to the total mass of the pigment, and has a polydispersity index [(D90−D10)/D50] of 1.10 to 1.45.

The polydispersity index of the pigment dispersion can be adjusted to the range described above, by adjusting the amount of incorporation of rosin acid in the mixed liquid production step of the invention described above, to 3% by mass or more and 30% by mass or less relative to the total mass of the pigment.

It is preferable that the pigment dispersing polymer in the pigment dispersion of the invention has a crosslinked structure.

It is preferable that the pigment dispersion of the invention further includes a compound having an acetylenediol group. The compound having an acetylenediol group is preferably a surfactant, and specific preferred examples thereof include SURFYNOL S82, 465, 485, DYNOL 604 and 607 (manufactured by Air Products & Chemicals, Inc.).

<Aqueous Inkjet Ink>

The aqueous inkjet ink (hereinafter, appropriately referred to as ink) of the invention includes at least the pigment dispersion described above.

The content of the pigment in the ink is preferably 4% by mass to 15% by mass, more preferably 4% by mass to 10% by mass, and even more preferably 4% by mass to 6% by mass, relative to the total solid content of the ink.

The ink of the invention may further include a water-soluble solvent and other additives.

Since the ink of the invention includes the pigment dispersion described above, the ink exhibits excellent dispersibility of the pigment and also has excellent storage stability and ejectability.

(Water-Soluble Organic Solvent)

The ink of the invention may contain at least one water-soluble organic solvent. As the ink contains a water-soluble organic solvent, a dryness preventing effect and a wetting or penetration enhancing effect can be obtained. For the prevention of drying, a water-soluble organic solvent can be used as a drying inhibitor that prevents the ink from adhering and drying at the ink discharge ports of a spray nozzle to form aggregates and clogging the discharge ports. Furthermore, for the enhancement of penetration, a water-soluble organic solvent can be used as a penetration enhancer that increases ink penetrability into a recording medium.

As a drying inhibitor, a water-soluble organic solvent having a vapor pressure lower than that of water is preferred. Specific examples of such a water-soluble organic solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, trimethylolpropane, and the like; lower alkyl ethers of polyhydric alcohols, such as ethylene glycol monomethyl (or ethyl) ether, diethylene glycol monomethyl (or ethyl) ether, and triethylene glycol monoethyl (or butyl) ether; heterocycles such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; polyfunctional compounds such as diacetone alcohol and diethanolamine; and urea derivatives.

Among these, polyhydric alcohols such as glycerin and diethylene glycol are preferred as the drying inhibitor.

The drying inhibitors may be used singly or in combination of two or more kinds thereof. The content of the drying inhibitor is preferably set to the range of 10% by mass to 50% by mass relative to the total mass of the ink.

As the penetration accelerator, a water-soluble organic solvent is suitable for the purpose of causing ink to effectively penetrate into a recording medium (printing paper or the like). Regarding specific examples of such a water-soluble organic solvent, alcohols such as ethanol, isopropanol, butanol, di(tri)ethylene glycol monobutyl ether, and 1,2-hexanediol can be suitably used. Furthermore, as the penetration accelerator, sodium lauryl sulfate, sodium oleate, a nonionic surfactant, and the like can also be suitably used.

The penetration accelerators may be used singly, or two or more kinds thereof may be used in combination. The content of the penetration accelerator is preferably in the range of 5% by mass to 30% by mass relative to the total mass of the ink. Furthermore, it is preferable to use the penetration accelerator in an amount that does not cause blurring of image and paper slipping (print-through).

In addition to the uses described above, a water-soluble organic solvent is used for the adjustment of viscosity. Specific examples of the water-soluble organic solvent that can be used for the adjustment of viscosity include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). In this case as well, the water-soluble organic solvents may be used singly or in combination of two or more kinds thereof.

(Water)

The ink contains water, and there are no particular limitations on the amount of water. Among them, a preferred content of water is 10% by mass to 99% by mass, more preferably 30% by mass to 80% by mass, and even more preferably 50% by mass to 70% by mass, relative to the total mass of the ink.

(Other Additives)

The ink of the invention may also include other additives in addition to the components described above. Examples of the other additives include known additives such as a water-soluble polymerizable compound, a polymerization initiator, resin particles, a fading inhibitor, an emulsion stabilizer, an ultraviolet absorber, a preservative, a fungicide, a pH adjusting agent, a surface tension adjuster, an anti-foaming agent, a viscosity-adjusting agent, a dispersant, a dispersion stabilizer, a rust inhibitor, and a chelating agent. These various additives are added directly to the ink.

A water-soluble polymerizable compound can enhance the adhesiveness of images. For a preferred form of the water-soluble polymerizable compound, reference can be appropriately made to the description of paragraphs 0037 to 0061 of JP2011-231315A.

A polymerization initiator is a compound added together with the water-soluble polymerizable compound, and this can enhance the scratch resistance of images and is advantageous for high-speed recording. For a preferred form of the polymerization initiator, reference can be appropriately made to the description of paragraphs 0062 to 0065 of JP2011-231315A.

An ultraviolet absorber can enhance preservability of images. Regarding the ultraviolet absorber, the benzotriazole-based compounds described in JP1983-185677A (JP-S58-185677A), JP1986-190537A (JP-S61-190537A), JP1990-782A (JP-H02-782A), JP1993-197075A (JP-H05-197075A), JP1997-34057A (JP-H09-34057A), and the like; the benzophenone-based compounds described in JP1971-2784A (JP-S46-2784A), JP1993-194483A (JP-H05-194483A), U.S. Pat. No. 3,214,463A, and the like; cinnamic acid-based compounds described in JP1973-30492B (JP-S48-30492B), JP1981-21141B (JP-S56-21141B), JP1998-88106A (JP-H10-88106A), and the like; the triazine-based compounds described in JP1992-298503A (JP-H04-

298503A), JP1996-53427A (JP-H08-53427A), JP1996-239368A (JP-H08-239368A), JP1998-182621A (JP-H10-182621A), JP1996-501291A (JP-H08-501291A), and the like; the compounds described in Research Disclosure No. 24239; and compound that absorb ultraviolet radiation and emit fluorescence, so-called fluorescent brightening agents, which are represented by stilbene-based and benzoxazole-based compounds, can also be used.

A fading inhibitor can enhance preservability of images. Examples of the fading inhibitor include various organic and metal complex-based fading inhibitors. Examples of the organic fading inhibitors include hydroquinones, alkoxyphenols, dialkoxyphenols, phenols, anilines, amines, indanes, chromanes, alkoxyanilines, and heterocycles. Examples of the metal complex-based fading inhibitors include nickel complexes and zinc complexes. More specifically, the compounds described in the patent documents cited in Research Disclosure No. 17643, pp. VII-I to VII-J; Research Disclosure No. 15162; Research Disclosure No. 18716, p. 650, left column; Research Disclosure No. 36544, p. 527; Research Disclosure No. 307105, p. 872; and Research Disclosure No. 15162, or the compounds included in the general formula of a representative compound and exemplary compounds described in pp. 127-137 of JP1987-215272A (JP-S62-215272A), can be used.

Examples of the fungicide include sodium dehydroacetate, sodium benzoate, sodium pyridinethione-1-oxide, p-hydroxybenzoic acid ethyl ester, 1,2-benzisothiazolin-3-one, and salts thereof. The content of the fungicide is preferably in the range of 0.02% by mass to 1.00% by mass relative to the total mass of the ink.

Regarding the pH adjusting agent, a neutralizing agent (an organic base or an inorganic alkali) can be used. A pH adjusting agent can enhance the storage stability of ink. It is preferable to add the pH adjusting agent such that the ink reaches pH 6 to pH 10, and it is more preferable to add the pH adjusting agent such that the ink reaches pH 7 to pH 10.

Examples of the surface tension adjuster include a nonionic surfactant, a cationic surfactant, an anionic surfactant, and a betaine-based surfactant.

The amount of addition of the surface tension adjuster is preferably in the range such that the surface tension of the ink can be adjusted to 20 mN/m to 60 mN/m, more preferably in the range such that the surface tension can be adjusted to 20 mN/m to 45 mN/m, and even more preferably in the range such that the surface tension can be adjusted to 25 mN/m to 40 mN/m. When the amount of addition is within the range, droplet ejection can be performed satisfactorily by an inkjet method.

Preferred embodiments of the surfactant are the same as the surfactants for the pigment dispersion described above.

The ink of the invention can be produced by, for example, the following method.

The method includes the various steps of the method for producing a pigment dispersion described above, and a step for producing an ink by mixing a pigment dispersion, a water-soluble organic solvent, and other additives. If necessary, the method may include other steps, if necessary.

When the invention is configured as described above, an ink which exhibits excellent dispersibility of the pigment and has excellent storage stability and ejectability is obtained.

EXAMPLES

Hereinafter, the invention will be explained more specifically by way of Examples; however, the invention is not intended to be limited to the following Examples as long as the gist is maintained. Unless particularly stated otherwise, the unit "parts" is on a mass basis.

Synthesis Example

Synthesis of Pigment Dispersing Polymer P-1

Pigment dispersing polymer P-1 was synthesized as follows.

Methacrylic acid (170 parts), benzyl methacrylate (830 parts), and isopropanol (375 parts) were mixed, and thereby a monomer supplying composition was prepared. 2,2-Azobis(2-methylbutyronitrile) (22.05 parts) and isopropanol (187.5 parts) were mixed, and thereby an initiator supplying composition was prepared.

Next, isopropanol (187.5 parts) was heated to 80° C. in a nitrogen atmosphere, and a mixture of the monomer supplying composition and the initiator supplying composition was added dropwise thereto for 2 hours. After completion of the dropwise addition, the mixture was maintained at 80° C. for another 4 hours, and then was cooled to 25° C. After cooling, the solvent was removed under reduced pressure, and thereby, pigment dispersing polymer P-1 having a weight-average molecular weight (Mw) of 29,000 and an acid value of 110.8 mg KOH/g was obtained.

The weight-average molecular weight and the acid value of pigment dispersing polymer P-1 were measured by the methods described above.

Synthesis of Pigment Dispersing Polymer P-2

Synthesis was carried out in the same manner as in the synthesis of P-1, except that the amount of incorporation of methacrylic acid in the synthesis of P-1 was changed from 170 parts to 228 parts, and the amount of incorporation of benzyl methacrylate was changed from 830 parts to 772 parts. Thus, pigment dispersing polymer P-2 having a Mw of 27,000 and an acid value of 148.6 mg KOH/g was obtained.

Synthesis of Pigment Dispersing Polymer P-3

Pigment dispersing polymer P-3 was synthesized as follows.

A 500-ml three-neck flask equipped with a stirrer and a cooling pipe was charged with 330 parts of methyl ethyl ketone, and the flask was heated to 75° C. in a nitrogen atmosphere. Subsequently, 20 parts of dimethyl 2,2'-azobisisobutyrate, 500 parts of phenoxyethyl methacrylate, 150 parts of methacrylic acid, and 350 parts of methyl methacrylate were dissolved in 700 parts of methyl ethyl ketone in a three-neck flask. This solution was added dropwise for 3 hours.

After completion of the dropwise addition, the mixture was allowed to react for one more hour, and then a solution obtained by dissolving 2 parts of dimethyl 2,2'-azobisisobutyrate in 20 parts of methyl ethyl ketone was added thereto. The temperature of the mixture was raised to 78° C., and then the mixture was heated for 4 hours. The reaction solution thus obtained was subjected to reprecipitation two times in a large excess of hexane, and a polymer thus precipitated was dried. Thus, pigment dispersing polymer P-3 having a Mw of 30,700 and an acid value of 97.8 mg KOH/g was obtained.

Synthesis of Pigment Dispersing Polymer P-4

Synthesis was carried out in the same manner as in the synthesis of P-1, except that the amount of incorporation of methacrylic acid in the synthesis of P-1 was changed from 170 parts to 265 parts, and the amount of incorporation of benzyl methacrylate was changed from 830 parts to 735 parts. Thus, pigment dispersing polymer P-4 having a Mw of 31,000 and an acid value of 172.8 mg KOH/g was obtained.

Synthesis of Pigment Dispersing Polymer P-5

Synthesis was carried out in the same manner as in the synthesis of P-1, except that the amount of incorporation of methacrylic acid in the synthesis of P-1 was changed from 170 parts to 100 parts, and the amount of incorporation of benzyl methacrylate was changed from 830 parts to 570 parts. Thus, pigment dispersing polymer P-5 having a Mw of 28,000 and an acid value of 65.1 mg KOH/g was obtained.

Example 1

Production of Pigment Dispersion 150 parts of pigment dispersing polymer P-1 obtained as described above was dissolved in water, and an aqueous solution of the pigment dispersing polymer was produced using an aqueous solution of potassium hydroxide such that the pH after neutralization was 9, and the concentration of the pigment dispersing polymer was about 25% by mass.

180 parts of this aqueous solution of the pigment dispersing polymer, 94.5 parts of Pigment Red containing added rosin acid Ca (mixture of calcium abietate, calcium neoabietate, and calcium palustrate) (rosin acid Ca-added PR) 122 (manufactured by Fuji Pigment Co., Ltd., FUJI FAST RED, amount of addition of rosin acid Ca to pigment: 5% by mass) (hereinafter, also referred to as rosin acid Ca-added pigment A), and 325.5 parts of water were mixed, and the mixture was subjected to a dispersing treatment for 3 hours using a beads mill (bead diameter: 0.1 mmφ, zirconia beads). Through this dispersing treatment, a mixed liquid of an uncrosslinked polymer-coated pigment having a pigment solid content concentration of 15% by mass (uncrosslinked mixed liquid) was obtained.

To 136 parts of the uncrosslinked mixed liquid thus obtained, 0.23 parts of DENACOL EX521 (manufactured by Nagase ChemteX Corporation, crosslinking agent) and 14.3 parts of an aqueous solution of boric acid (aqueous solution having a boric acid concentration of 4% by mass) were added, and the mixture was allowed to react for 6 hours at 70° C. After the reaction, the reaction mixture was cooled to 25° C., and thereby a dispersion of a crosslinked polymer-coated pigment having a pigment solid content concentration of 11% by mass (crosslinked mixed liquid) was obtained.

The crosslinked mixed liquid was flowed through a polyether sulfone (PESU) membrane having a micropore size of 0.1 μm, at a flow rate of 600 mL for 1 minute, using a cross-flow type ultrafiltration filter (UF) (manufactured by Sartorius AG, ultrafiltration apparatus). The temperature at this time was adjusted to be 25° C., and ultrafiltration was carried out 10 times by taking one-fold of the volume multiple ratio of the introduced liquid as one time. Thus, pigment dispersion 1 (pigment solid content concentration 15% by mass) was obtained.

Example 2

150 parts of pigment dispersing polymer P-1 obtained as described above and 4.5 parts of gum rosin (manufactured by Arakawa Chemical Industries, Ltd., rosin acid) were dissolved in water, and an aqueous solution of the pigment dispersing polymer was produced using an aqueous solution of potassium hydroxide such that the pH after neutralization was 9, and the concentration of the polymer dispersing pigment was about 25% by mass.

180 parts of this aqueous solution of the pigment dispersing polymer, 90 parts of CHROMOFINE RED (manufactured by Dainichiseika Color & Chemicals Manufacturing Co., Ltd., PR122), and 325.5 parts of water were mixed, and the mixture was subjected to a dispersing treatment for 3 hours using a beads mill (bead diameter: 0.1 mmφ, zirconia beads). Through this dispersing treatment, a mixed liquid of an uncrosslinked polymer-coated pigment having a pigment solid concentration of 15% by mass (uncrosslinked mixed liquid) was obtained.

To 136 parts of the uncrosslinked mixed liquid thus obtained, 0.23 parts of DENACOL EX521 (manufactured by Nagase ChemteX Corporation, crosslinking agent) and 14.3 parts of an aqueous solution of boric acid (aqueous solution having a boric acid concentration of 4% by mass) were added, and the mixture was allowed to react for 6 hours at 70° C. After the reaction, the reaction mixture was cooled to 25° C., and thereby a mixed liquid of a crosslinked polymer-coated pigment having a pigment solid content concentration of 11% by mass (crosslinked mixed liquid) was obtained.

The crosslinked mixed liquid was flowed through a PESU membrane having a pore size of 0.1 μm, at a flow rate of 600 mL/min, using a cross-flow type UF (manufactured by Sartorius AG, ultrafiltration apparatus). The temperature at this time was adjusted to be 25° C., and ultrafiltration was carried out 10 times by taking one-fold of the volume multiple ratio of the introduced liquid as one time. Thus, pigment dispersion 2 (pigment solid content concentration 15% by mass) was obtained.

Example 3

150 parts of pigment dispersing polymer P-1 obtained as described above was dissolved in water, and an aqueous solution of the pigment dispersing polymer was produced using an aqueous solution of potassium hydroxide such that the pH after neutralization was 9, and the concentration of the pigment dispersing polymer was about 25% by mass.

180 parts of this aqueous solution of the pigment dispersing polymer, 94.5 parts of rosin acid Ca-added pigment A, 318.8 parts of water, and 6.75 parts of DYNOL 607 (manufactured by Air Products & Chemicals, Inc., compound having an acetylenediol group) were mixed, and the mixture was subjected to a dispersing treatment for 3 hours using a beads mill (bead diameter: 0.1 mmφ, zirconia beads). Through this dispersing treatment, a mixed liquid of an uncrosslinked polymer-coated pigment having a pigment solid content concentration of 15% by mass (uncrosslinked mixed liquid) was obtained.

To 136 parts of the uncrosslinked mixed liquid thus obtained, 0.23 parts of DENACOL EX521 (manufactured by Nagase ChemteX Corporation, crosslinking agent) and 14.3 parts of an aqueous solution of boric acid (aqueous solution having a boric acid concentration of 4% by mass) were added, and the mixture was allowed to react for 6 hours at 70° C. After the reaction, the reaction mixture was cooled to 25° C., and thereby a mixed liquid of a crosslinked polymer-coated pigment having a pigment solid content concentration of 11% by mass (crosslinked mixed liquid) was obtained.

The crosslinked mixed liquid was flowed through a PESU membrane having a pore size of 0.1 μm, at a flow rate of 600 mL/min, using a cross-flow type UF (manufactured by Sartorius AG, ultrafiltration apparatus). The temperature at this time was adjusted to be 25° C., and ultrafiltration was carried out 10 times by taking one-fold of the volume multiple ratio of the introduced liquid as one time. Thus, pigment dispersion 3 (pigment solid content concentration 15% by mass) was obtained.

Example 4 to Example 11

Pigment dispersion 4 to pigment dispersion 11 for Example 4 to Example 11 were respectively produced in the same manner as in the production of pigment dispersion 1, except that the pigment dispersing polymer, the amount of addition of rosin acid Ca, the number of times of ultrafiltration and collection, or the kind of the filter used for pigment dispersion 1 were changed as indicated in the following Table 2.

In pigment dispersion 6, the amount of addition of rosin acid Ca was adjusted by changing the rosin acid Ca-added pigment A in pigment dispersion 1 to 117 parts of rosin acid Ca-added PR122 (manufactured by Fuji Pigment Co., Ltd., FUJI FAST RED, amount of addition of rosin acid with respect to the pigment: 30% by mass) (hereinafter, also referred to as rosin acid Ca-added pigment B) and 303 parts of water. In pigment dispersion 7, the amount of addition of rosin acid Ca was adjusted by changing the rosin acid Ca-added pigment A in pigment dispersion 1 to 103.5 parts of rosin acid Ca-added PR122 (manufactured by Fuji Pigment Co., Ltd., FUJI FAST RED, amount of addition of rosin acid with respect to the pigment: 15% by mass) (hereinafter, also referred to as rosin acid Ca-added pigment C) and 316.5 parts of water.

Comparative Example 1

Pigment dispersion 12 for Comparative Example 1 was produced in the same manner as in the production of pigment dispersion 1, except that the rosin acid Ca-added pigment A in pigment dispersion 1 in Example 1 was changed to CHROMOFINE RED (manufactured by Dainichiseika Color & Chemicals Manufacturing Co., Ltd., PR122).

Comparative Example 2, Comparative Example 3, Comparative Example 5, and Comparative Example 6

Pigment dispersion 13, pigment dispersion 14, pigment dispersion 16, and pigment dispersion 17 for Comparative Example 2, Comparative Example 3, Comparative Example 5, and Comparative Example 6 were respectively produced in the same manner as in the production of pigment dispersion 1, except that the amount of rosin acid Ca, and the number of times of ultrafiltration and collection used for pigment dispersion 1 in Example 1 were changed as indicated in the following Table 2.

The amount of addition of rosin acid Ca was adjusted for pigment dispersion 13 in the same manner as in the case of pigment dispersion 6, and the same amount was adjusted for pigment dispersion 14 in the same manner as in the case of pigment dispersion 7.

In pigment dispersion 16, the amount of addition of rosin acid Ca was adjusted by changing the rosin acid Ca-added pigment A in pigment dispersion 1 to 91.4 parts of rosin acid Ca-added PR122 (manufactured by Fuji Pigment Co., Ltd., FUJI FAST RED, amount of addition of rosin acid with respect to the pigment: 1.5% by mass) (hereinafter, also referred to as rosin acid Ca-added pigment D) and 328.6 parts of water.

In pigment dispersion 17, the amount of addition of rosin acid Ca was adjusted by changing the rosin acid Ca-added pigment A to 135 parts of rosin acid Ca-added PR122 (manufactured by Fuji Pigment Co., Ltd., FUJI FAST RED, amount of addition of rosin acid with respect to the pigment: 50% by mass) (hereinafter, also referred to as rosin acid Ca-added pigment E) and 285 parts of water.

Comparative Example 4

Pigment dispersion 15 for Comparative Example 4 was produced in the same manner as in the production of pigment dispersion 1, except that ultrafiltration of the crosslinked dispersion performed in the production of pigment dispersion 1 in Example 1 was not carried out. In pigment dispersion 15, the crosslinked mixed liquid (pigment solid content concentration: 11% by mass) was distilled under reduced pressure using an evaporator, and the pigment solid content concentration was adjusted to 15% by mass.

Comparative Example 7

150 parts of pigment dispersing polymer P-1 obtained as described above was dissolved in water, and an aqueous solution of the pigment dispersing polymer was produced using an aqueous solution of potassium hydroxide, such that the pH after neutralization was 9, and the concentration of the pigment dispersing polymer was about 25% by mass.

180 parts of this aqueous solution of the pigment dispersing polymer, 94.5 parts of rosin acid Ca-added pigment A, and 323 parts of water were mixed, and the mixture was subjected to a dispersing treatment for 3 hours using a beads mill (bead diameter: 0.1 mmϕ, zirconia beads). Through this dispersing treatment, a mixed liquid of an uncrosslinked polymer-coated pigment having a pigment solid content concentration of 15% by mass (uncrosslinked mixed liquid) was obtained.

To 136 parts of the uncrosslinked mixed liquid thus obtained, 0.23 parts of DENACOL EX521 (manufactured by Nagase ChemteX Corporation, crosslinking agent) and 14.3 parts of an aqueous solution of boric acid (aqueous solution having a boric acid concentration of 4% by mass) were added, and the mixture was allowed to react for 6 hours at 70° C. After the reaction, the mixture was cooled to 25° C., and thereby a mixed liquid of a crosslinked polymer-coated pigment having a pigment solid content concentration of 11% by mass (crosslinked mixed liquid) was obtained.

The crosslinked mixed liquid was subjected to pressure filtration 10 times using a pressure filtering apparatus having a KS-25S stainless steel line holder connected to a pressure tank for filtration and a HANDY PUMP (manufactured by Advantec MFS, Inc.), and using a 0.5-μm filter. Thus, pigment dispersion 18 (pigment solid content concentration: 15%) was obtained.

[Production of Ink]

The respective pigment dispersions of Example 1 to Example 11 and Comparative Example 1 to Comparative Example 7 (pigment dispersions 1 to 18) obtained as described above were mixed with the components described below so as to obtain the following compositions. Each of the mixtures was filled in a plastic disposable syringe and filtered through a 5-μm PVDF filter (MILLEX-SV, diameter 25 mm, manufactured by Millipore Corporation), and thus inks were obtained.

For the inks thus obtained, an evaluation of ejectability was conducted. The evaluation results are presented in the following Table 2.

~Composition of Ink~

| | |
|---|---|
| Pigment dispersion (pigment solid content concentration: 15% by mass) | 6.5 parts |
| Tripropylene glycol monomethyl ether (TPGmME) (manufactured by Wako Pure Chemical Industries, Ltd., water-soluble organic solvent) | 2.0 parts |
| Dipropylene glycol (DPG) (manufactured by Wako Pure Chemical Industries, Ltd., water-soluble organic solvent) | 2.0 parts |
| SANNIX GP250 (manufactured by Sanyo Chemical Industries, Ltd., water-soluble organic solvent) | 10.0 parts |
| Urea | 5.0 parts |
| OLFINE E1010 (manufactured by Nissin Chemical Industry Co., Ltd., surfactant) | 1.5 parts |
| Ion exchange water | Balance to make up a total amount of 100 parts |

[Evaluation]

(Content of Rosin Acid)

Extraction of rosin acid was performed by the following procedure for the pigment dispersions of the Examples and Comparative Examples described above, and the total amount of rosin acid included in each of the pigment dispersions was determined by quantitatively measuring the amount using gas chromatography (GC).

—Procedure for Extraction of Rosin Acid—

1) 25 g of a pigment dispersion was mixed with 25 g of chloroform, and the mixture was transferred to a separatory funnel and thoroughly shaken. 50 g of water was added to the separatory funnel, the mixture was sufficiently mixed, and the mixture was left to reach an equilibrium state.

2) A lower layer (organic layer) was extracted from the cock at the bottom of the separatory funnel, and the lower layer was transferred to another container (flask or the like). Next, the upper layer (aqueous layer) was extracted from the top of the separatory funnel, and the upper layer was transferred to a container other than the container to which the organic layer had been transferred.

3) The aqueous layer was brought back into the separatory funnel, 25 g of chloroform was added thereto, and step 2) was repeated 5 times.

4) All of the organic layers were poured into a separatory funnel, 50 g of ultrapure water (water having an amount of impurities of 0.01 μg/L or less) was added thereto, and the mixture was sufficiently mixed to reach an equilibrium state.

5) An upper layer (ultrapure water layer) and a lower layer (organic layer) were separated, and the organic layer was dried over sodium sulfate. The solvent was distilled off, and rosin acid was extracted.

—Gas Chromatography—

Apparatus: GAS CHROMATOGRAPHY 14B, manufactured by Shimadzu Corporation

Column used: Glass column having a length of 2.1 m and a diameter of 5φ×2.6φ Column filler: SILICONE SE-30 UNIPORT B (Polydispersity Index)

For the pigment dispersions of the Examples and Comparative Examples described above, an analysis of the particle size distribution of the polymer-coated pigment was performed by a dynamic light scattering method using NANOTRAC particle size distribution measurement apparatus UPA-EX150 (manufactured by Nikkiso Co., Ltd.).

The average particle size, D90, D50, and D10 (D90, D50, and D10 represent the particle sizes equivalent to 0.9 (90 number %), 0.5 (50 number %), and 0.1 (10 number %), respectively, of the total number of particles of the dispersed particles) were calculated from the particle size distributions thus obtained, and the polydispersity index (PDI) was estimated by the following Expression (1).

$$PDI = (D90 - D10)/D50 \quad \text{Expression (1)}$$

(Storage Stability)

The inks prepared in the Examples and Comparative Examples described above were left to stand in a sealed state for 336 hours at 60° C., subsequently the average particle size of the polymer-coated pigment and viscosity were measured, and the change ratios of the liquid properties before and after a lapse of time was calculated. Thus, storage stability was evaluated. The change ratios were respectively determined by the expressions: [(viscosity after a lapse of time−initial viscosity)/initial viscosity]×100, and [(average particle size after a lapse of time−initial average particle size)/initial average particle size]×100.

The average particle size was measured by the method described above. Viscosity was measured at 30° C. using a B type viscometer (manufactured by Brookfield AMETEK, Inc.).

—Evaluation Standard—

AA: The change ratio before and after a lapse of time of the average particle size of the polymer-coated pigment, and the change ratio of viscosity were both less than 1%.

A: The change ratio before and after a lapse of time of the average particle size of the polymer-coated pigment was 1% or more and less than 2%, and the change ratio of viscosity was 1% or more and less than 6%.

B: The change ratio before and after a lapse of time of the average particle size of the polymer-coated pigment was 2% or more and less than 5%, and the change ratio of viscosity was 6% or more and less than 15%.

C: The change ratio of before and after a lapse of time of the average particle size of the polymer-coated pigment was 5% or more and less than 10%, and the change ratio of viscosity was 15% or more and less than 25%.

D: The change ratio of before and after a lapse of time of the average particle size of the polymer-coated pigment was 10% or more, and the change ratio of viscosity was less than 25%.

(Ejectability)

A GELJET GX5000 printer head manufactured by Ricoh Co., Ltd. was fixed in such a manner that the direction of the line head in which nozzles were lined up (primary scanning direction) was aligned with a direction perpendicular to the direction of movement (secondary scanning direction) of a stage that was movable in a predetermined linear direction at 500 mm/sec.

Subsequently, a storage tank connected to this was filled again with ink 1 described above. KASSAI PHOTO FINISH PRO manufactured by Fujifilm Corporation was attached to the stage as a recording medium.

Subsequently, a print sample was produced by moving the stage at 248 mm/min, and ejecting out 2,000 ink droplets per nozzle (one ejecting port) under conditions of an amount of ink droplets of 3.4 pL, a ejecting frequency of 10 kHz, and a resolution of nozzle arrangement direction×transport direction 75 dpi×1200 dpi (dots per inch) so as to print 96 lines in a direction parallel to the transport direction.

The print sample thus obtained was visually observed, and it was confirmed that ink was ejected out from all of the nozzles (ejecting ports).

After the ejecting of ink, the head was left to stand in that state for 3 hours in an environment of 25° C. and 80% RH, subsequently a fresh recording medium was attached thereon, and a print sample was produced by ejecting the ink again under similar conditions.

The print sample thus obtained was visually observed, and the number of nozzles through which ink was not ejected out after ejecting of 2,000 droplets (number of non-ejecting nozzles) was evaluated.

The samples were rated from A to D according to the number of non-ejecting nozzles (unit: nozzles). At this time, when the number of non-ejecting nozzles is 10 or less, the sample is in a practically acceptable range.

—Evaluation Standard—
A: The number of non-ejecting nozzles was 0 to 5.
B: The number of non-ejecting nozzles was 6 to 10.
C: The number of non-ejecting nozzles was 11 to 15.
D: The number of non-ejecting nozzles was 16 or more.

TABLE 2

| | | | Rosin acid | | Polymer | | Acetylenediol compound | |
| --- | --- | --- | --- | --- | --- | --- | --- | --- |
| | | Pigment | Amount of addition (relative to pigment) [%] | Order of addition *1, *2 | Structure | Acid value [mg KOH/g] | Kind | Content (relative to pigment) [%] |
| Example 1 | Pigment dispersion 1 | A | 5 | Added earlier | P-1 | 110.8 | — | — |
| Example 2 | Pigment dispersion 2 | PR122 | 5 | Added later | P-1 | 110.8 | — | — |
| Example 3 | Pigment dispersion 3 | A | 5 | Added earlier | P-1 | 110.8 | DYNOL607 | 15 |
| Example 4 | Pigment dispersion 4 | A | 5 | Added earlier | P-2 | 148.6 | — | — |
| Example 5 | Pigment dispersion 5 | A | 5 | Added earlier | P-3 | 97.8 | — | — |
| Example 6 | Pigment dispersion 6 | B | 30 | Added earlier | P-1 | 110.8 | — | — |
| Example 7 | Pigment dispersion 7 | C | 15 | Added earlier | P-1 | 110.8 | — | — |
| Example 8 | Pigment dispersion 8 | A | 5 | Added earlier | P-4 | 172.8 | — | — |
| Example 9 | Pigment dispersion 9 | A | 5 | Added earlier | P-5 | 65.1 | — | — |
| Example 10 | Pigment dispersion 10 | A | 5 | Added earlier | P-1 | 110.8 | — | — |
| Example 11 | Pigment dispersion 11 | A | 5 | Added earlier | P-1 | 110.8 | — | — |
| Comparative Example 1 | Pigment dispersion 12 | PR122 | 0 | Added earlier | P-1 | 110.8 | — | — |
| Comparative Example 2 | Pigment dispersion 13 | B | 30 | Added earlier | P-1 | 110.8 | — | — |
| Comparative Example 3 | Pigment dispersion 14 | C | 15 | Added earlier | P-1 | 110.8 | — | — |
| Comparative Example 4 | Pigment dispersion 15 | A | 5 | Added earlier | P-1 | 110.8 | — | — |
| Comparative Example 5 | Pigment dispersion 16 | D | 1.5 | Added earlier | P-1 | 110.8 | — | — |
| Comparative Example 6 | Pigment dispersion 17 | E | 50 | Added earlier | P-1 | 110.8 | — | — |
| Comparative Example 7 | Pigment dispersion 18 | A | 5 | Added earlier | P-1 | 110.8 | — | — |

TABLE 2-continued

|  | Filtration | | | Rosin acid Content after reduction step (relative to pigment) [%] | Particle size of polymer-coated pigment [nm] | Polydispersity index (D90-D10)/D50 | Storage stability | Ejectability |
| --- | --- | --- | --- | --- | --- | --- | --- | --- |
|  | Mode | Number of times (volume multiple ratio) | Filter type | | | | | |
| Example 1 | Ultrafiltration | 10 | 0.1μ | 1.5 | 98 | 1.21 | AA | A |
| Example 2 | Ultrafiltration | 10 | 0.1μ | 1.4 | 100 | 1.25 | A | A |
| Example 3 | Ultrafiltration | 10 | 0.1μ | 1.0 | 102 | 1.15 | AA | A |
| Example 4 | Ultrafiltration | 10 | 0.1μ | 1.8 | 115 | 1.41 | A | A |
| Example 5 | Ultrafiltration | 10 | 0.1μ | 2.9 | 125 | 1.31 | A | B |
| Example 6 | Ultrafiltration | 12 | 0.1μ | 2.0 | 104 | 1.26 | A | A |
| Example 7 | Ultrafiltration | 12 | 0.1μ | 2.1 | 100 | 1.27 | A | A |
| Example 8 | Ultrafiltration | 10 | 0.1μ | 2.0 | 120 | 1.42 | B | A |
| Example 9 | Ultrafiltration | 10 | 0.1μ | 1.5 | 132 | 1.30 | B | A |
| Example 10 | Ultrafiltration | 10 | 0.1μ | 0.3 | 101 | 1.20 | A | A |
| Example 11 | Ultrafiltration | 10 | 300 kD | 1.4 | 102 | 1.23 | A | A |
| Comparative Example 1 | Ultrafiltration | 10 | 0.1μ | 0.0 | 140 | 2.12 | D | C |
| Comparative Example 2 | Ultrafiltration | 5 | 0.1μ | 7.5 | 100 | 1.26 | C | D |
| Comparative Example 3 | Ultrafiltration | 5 | 0.1μ | 6.0 | 108 | 1.29 | C | D |
| Comparative Example 4 | Without filtration | | | 5.0 | 102 | 1.23 | D | D |
| Comparative Example 5 | Ultrafiltration | 5 | 0.1μ | 1.5 | 165 | 1.55 | D | C |
| Comparative Example 6 | Due to gelling, reduction step and subsequent processes were not performed | | | — | Gelled | — | — | — |
| Comparative Example 7 | Pressure filtration | 10 | 0.5μ | 4.5 | 105 | 1.26 | D | D |

*1 "Added earlier" means that the pigment and rosin acid were mixed, and then the pigment dispersing polymer was added thereto.
*2 "Added after" means that the pigment, rosin acid, and the pigment dispersing polymer were simultaneously mixed.
The pigment in Table 2 will be explained below.
A: Rosin acid Ca-added pigment A (amount of addition of rosin acid Ca with respect to the pigment: 5% by mass)
B: Rosin acid Ca-added pigment B (amount of addition of rosin acid Ca with respect to the pigment: 30% by mass)
C: Rosin acid Ca-added pigment C (amount of addition of rosin acid Ca with respect to the pigment: 15% by mass)
D: Rosin acid Ca-added pigment D (amount of addition of rosin acid Ca with respect to the pigment: 1.5% by mass)
E: Rosin acid Ca-added pigment E (amount of addition of rosin acid Ca with respect to the pigment: 50% by mass)
PR122: CHROMOFINE RED It can be seen from Table 2 that the Examples exhibit excellent dispersibility and storage stability of the pigment dispersion, and excellent ejectability when the pigment dispersion is produced into ink. That is, it can be seen that when the amount of incorporation of rosin acid in the mixed liquid production step and the content of rosin acid in the reduction step are adjusted to predetermined ranges, the pigment dispersions exhibit excellent dispersibility and storage stability and excellent ejectability when the pigment dispersion is produced into ink.

Furthermore, from a comparison between Example 1 and Example 2, it can be seen that when a pigment is mixed with rosin acid in the mixed liquid production step, and then the mixture is mixed with a pigment dispersing polymer, superior storage stability is obtained.

Furthermore, from a comparison between Example 1 and Example 3, it can be seen that when a compound having an acetylenediol group is further incorporated in the mixed liquid production step, superior storage stability is obtained.

In Comparative Example 1 and Comparative Example 5, it can be seen that the amount of incorporation of rosin acid in the mixed liquid production step is smaller than a predetermined range, and storage stability is especially poor.

In Comparative Example 2, Comparative Example 3, and Comparative Example 7, it can be seen that the content of rosin acid in the reduction step exceeds a predetermined range, and the ejectability obtainable when the pigment dispersion is produced into ink is especially poor.

As described above, an aqueous inkjet pigment dispersion which exhibits excellent dispersibility and storage stability after dispersing, and excellent ejectability when produced into ink; a method for producing the same; and an aqueous inkjet ink can be provided.

The entire disclosure of JP2014-074721 is incorporated herein by reference.

All publications, patent applications, and technical standards described in the present specification are herein incorporated by reference to the same extent as if each individual publication, patent application, or technical standard was specifically and individually indicated to be incorporated by reference.

What is claimed is:
1. A method for producing an aqueous inkjet pigment dispersion, the method comprising:
   producing a mixed liquid of water, a pigment, a pigment dispersing polymer, and rosin acid in an amount of from 3% by mass to 30% by mass relative to the total mass of the pigment; and
   reducing the amount of rosin acid included in the produced mixed liquid, to less than 3.0% by mass relative to the total mass of the pigment.

2. The method for producing an aqueous inkjet pigment dispersion according to claim 1, wherein the amount of rosin acid after the reducing of the amount of rosin acid is 0.25% by mass or more and less than 3.0% by mass relative to the total mass of the pigment.

3. The method for producing an aqueous inkjet pigment dispersion according to claim 1, wherein the reducing of the amount of rosin acid involves reducing the amount of rosin acid using ultrafiltration.

4. The method for producing an aqueous inkjet pigment dispersion according to claim 1, further comprising cross-linking the pigment dispersing polymer, after the producing of a mixed liquid.

5. The method for producing an aqueous inkjet pigment dispersion according to claim 1, wherein the producing of a mixed liquid involves mixing the pigment and rosin acid, and then mixing the resultant with the pigment dispersing polymer.

6. The method for producing an aqueous inkjet pigment dispersion according to claim 1, wherein the acid value of the pigment dispersing polymer is 90 mg KOH/g to 150 mg KOH/g.

7. The method for producing an aqueous inkjet pigment dispersion according to claim 1, wherein the acid value of the pigment dispersing polymer is 100 mg KOH/g to 120 mg KOH/g.

8. The method for producing an aqueous inkjet pigment dispersion according to claim 1, wherein the pigment dispersing polymer has a hydrophilic structural unit and a hydrophobic structural unit.

9. The method for producing an aqueous inkjet pigment dispersion according to claim 1, wherein the pigment dispersing polymer has a hydrophilic structural unit derived from (meth)acrylic acid, and a hydrophobic structural unit derived from at least one selected from $C_1$-$C_{20}$ alkyl (meth)acrylate and derivatives thereof, benzyl (meth)acrylate and derivatives thereof, and phenoxyethyl (meth)acrylate and derivatives thereof.

10. The method for producing an aqueous inkjet pigment dispersion according to claim 1, wherein in the producing of a mixed liquid, a compound having an acetylenediol group is further incorporated.

11. The method for producing an aqueous inkjet pigment dispersion according to claim 1, wherein the rosin acid is a mixture comprising one or more selected from abietic acid and a salt thereof, neoabietic acid and a salt thereof, dehydroabietic acid and a salt thereof, palustric acid and a salt thereof, levopimaric acid and a salt thereof, pimaric acid and a salt thereof, isopimaric acid and a salt thereof, and citronellic acid and a salt thereof.

* * * * *